United States Patent [19]

Hassellof et al.

[11] 3,802,356

[45] Apr. 9, 1974

[54] LOCK PIN MECHANISM

[75] Inventors: Donald Elmer Hassellof, Munster, Ind.; Albert Albin Orne, Crete, Ill.

[73] Assignee: General American Transportation Corporation, Chicago, Ill.

[22] Filed: Feb. 28, 1973

[21] Appl. No.: 336,544

[52] U.S. Cl............... 105/376, 105/369 A, 105/422
[51] Int. Cl.......................... B60p 7/14, B61d 45/00
[58] Field of Search................ 105/369 B, 376, 422; 280/179 B; 292/32, 38, 163, 141

[56] References Cited
UNITED STATES PATENTS

| | | | |
|---|---|---|---|
| 3,191,546 | 6/1965 | Adler................................. | 105/376 |
| 3,427,997 | 2/1969 | Brown, Jr. et al................. | 105/376 |
| 3,720,174 | 3/1973 | Heard............................... | 105/376 |
| 3,735,712 | 5/1973 | Krokos.............................. | 105/376 |

*Primary Examiner*—Brayton E. Hoffman
*Attorney, Agent, or Firm*—Prangley, Dithmar, Vogel, Sandler & Stotland

[57] ABSTRACT

A lock pin for use with a lading separator or bulkhead in a freight carrying vehicle. A floor latch strip is provided to cooperate with the lading separator which has attached to each end thereof a lock pin with an elongated tapered member having a tapered latch element at the bottom end thereof that fits within a locking slot in the floor latch strip. The latch element is continually urged downwardly to a locking position for engagement with a slot in the floor latch strip. A control mechanism is provided for moving the latch element inwardly and away from the floor latch strip to an unlatching position thereof.

12 Claims, 5 Drawing Figures

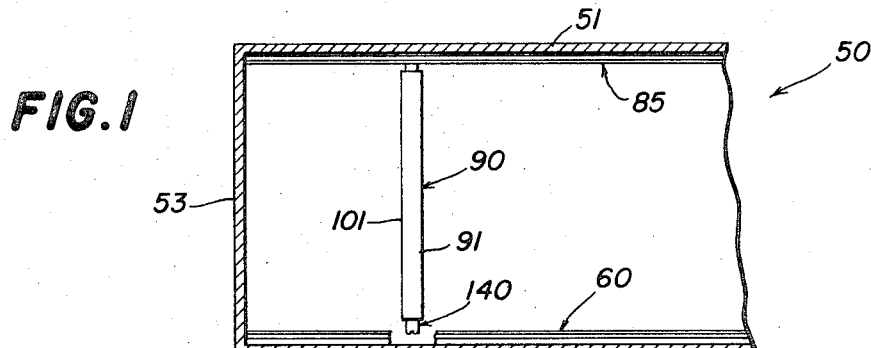
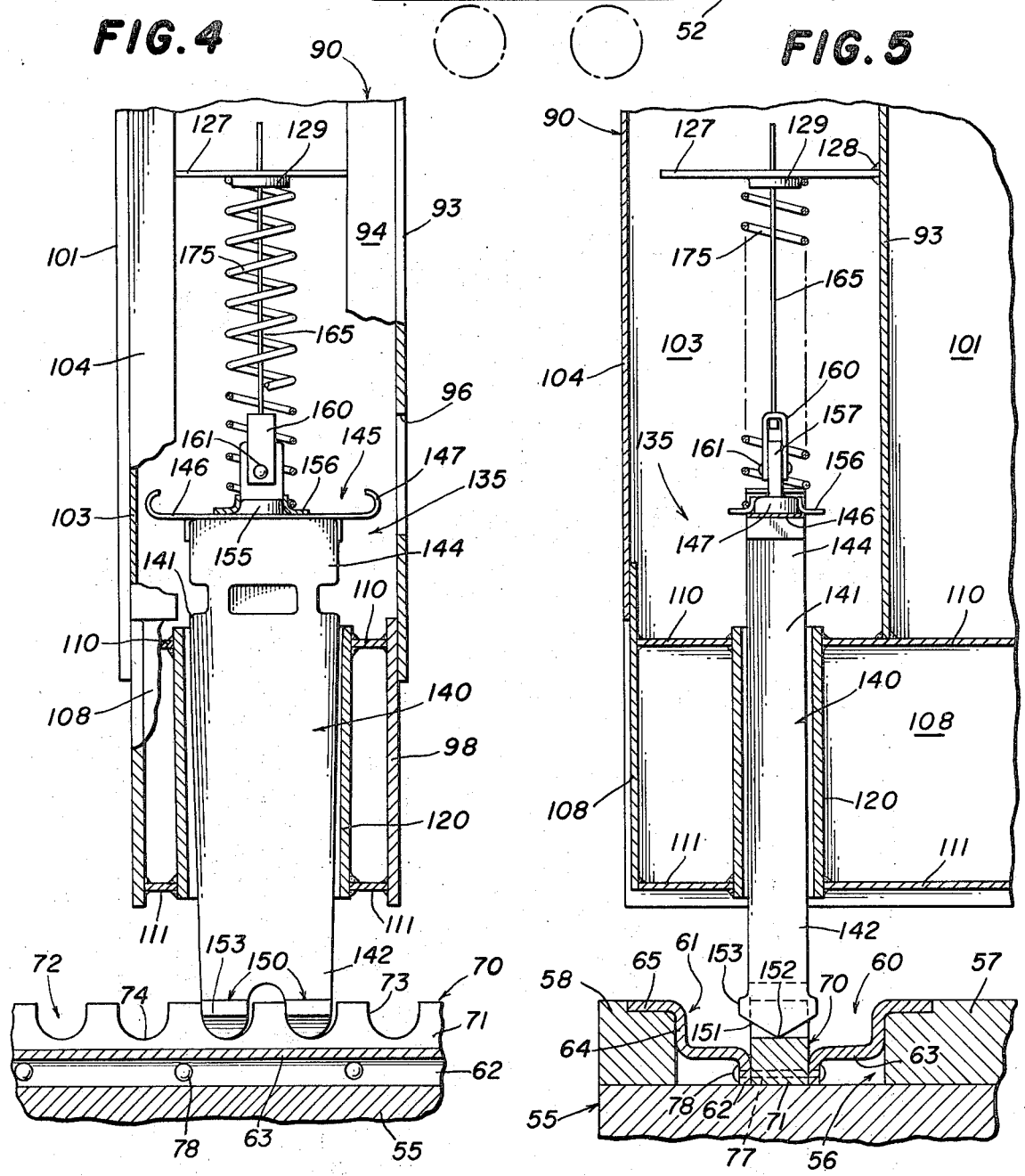

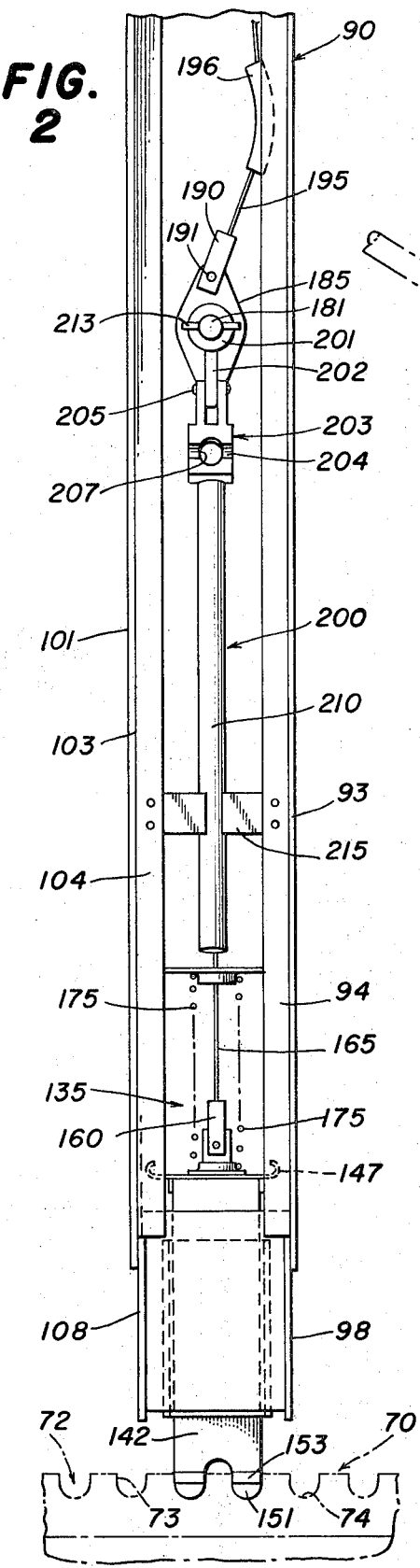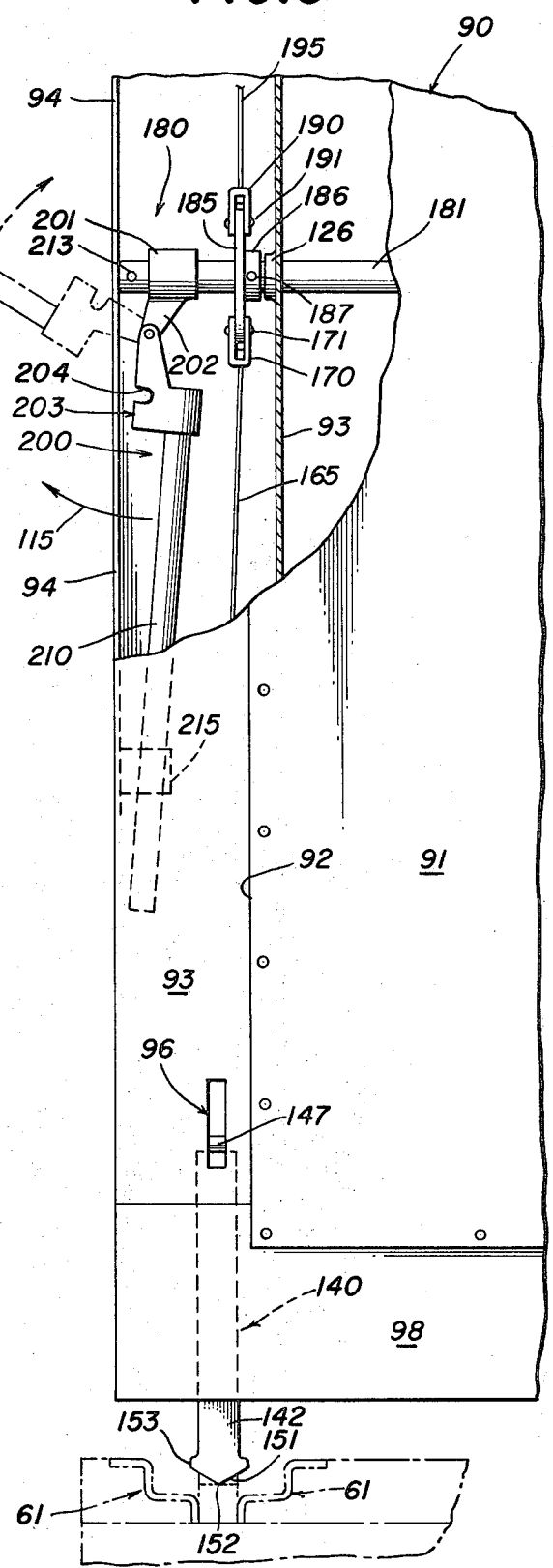

LOCK PIN MECHANISM

This invention relates to a lock pin mechanism for use with a leading separator in a freight carrying vehicle and more particularly to a lock pin mechanism having tapered surfaces.

It is an important object of the present invention to provide a lock pin mechanism comprising an elongated member having a tapered downwardly projecting latch element, the tapered latch element being constructed and arranged to fit within a locking slot in the floor latch strip and to provide a reduced area of contact between the latch element and the slot to enable the latch element to be pried from the skot, means for continually urging the latch element downwardly to a locking position thereof wherein the latch element is in engagement with a slot in the floor latch strip, and control mechanism for moving the latch element to an unlocking position thereof wherein the latch element is spaced from the floor latch strip thereby enabling movement of the lading spearator longitudinally of the freight carrying vehicle, whereby the latch element is normally biased into the locking position thereof to prevent movement of the lading separator and may be moved to the unlocking position thereof by actuation of the control mechanism and may be moved to the unlocking position thereof if jammed due to loading forces on the lading separator by insertion of a tool between the locking slot and the tapered latch element followed by prying the latch element to the unlocking position threreof.

Another object of the present invention is to provide a lock pin mechanism of the type set forth wherein the tapered latch lelement has projections extending outwardly thereof beyond the side walls of the locking slots in the floor latch strip to prevent the latch element from dislodging from the locking slot.

A further object of the present invention is to provide a lock pin mechanism of the type set forth wherein indicator means are mounted on the elongated member and extend outwardly therefrom to indicate the position of the latch element with respect to the floor latch strip.

These and other objects of the present invention together with further objects and advantages thereof will best be understood by reference to the following specification taken in connection with the accompanying drawings wherein:

FIG. 1 is a side elevational view of a railway car showing the position of a bulkhead or lading separator therein;

FIG. 2 is an end elevational view of the lading separator and lock pin mechanism therefor particularly illustrating the present invention;

FIG. 3 is a side elevational view of the bulkhead shown in FIG. 2 having certain portions broken away to show the control mechanism for the lock pin mechanism;

FIG. 4 is an enlarged sectional view of the lock pin mechanism shown in FIG. 2; and FIG. 5 is an enlarged sectional view partly in elevation of the lock pin mechanism shown in FIG. 3.

Referring now to the drawings, and particularly to FIGS. 1 and 5 thereof, there is disclosed a railway car 50 including a roof 51 and a floor 52 interconnected by end walls 53 and side walls, not shown. The floor 52 is provided with a load bearing deck 55 which includes two spaced apart longitudinally extending channels 56 dividing the deck 55 into two end sections 57 adjacent the respective side walls and a center section 58. It should be understood that two channels 56 are provided, although only one such channel is shown, and also that the railway car 50 is supported by the usual truck structure shown in phantom in FIG. 1.

Each of the channels 56 has positioned therein a floor latch strip 60 which includes two longitudinally extending M-shaped bars 61. Each of the M-shaped bars 61 includes a vertically extending flange 62 integrally connected to a horizontally extending flange 63 which is integrally connected to a vertically extending flange 64 which in turn is integrally connected to a horizontally extending support flange 65. The two horizontally extending flanges 63 and the respective ones of the vertically extending flanges 64 form an upper channel extending longitudinally of the car 50 while the vertically extending flanges 62 form a lower channel centrally disposed below the upper channel. The support flanges 65 rest respectively on the end sections 57 and the center section 58 of the deck 55, the floor latch strips 60 extending substantially the entire length of the railway car 50.

Each of the floor latch strips 60 further includes a keeper 70 comprised of an elongated bar 71 tightly fitting between the vertically extending flanges 62 of the M-shaped bars 61 and extending longitudinally of the car 50. Each of the bars 71 is provided with a plurality of spaced apart latching slots 72 each formed of opposed side walls 73 and an arcuate bottom wall 74. The keeper 70 is maintained in place by a plurality of rivets 77 having enlarged heads 78, the rivets extending through the flanges 62 and the bar 71 thereby to position the keeper 70 with respect to the M-shaped bars 61 in the floor latch strip 60.

The railway car 50 is further provided with two spaced apart tracks 85 securely fastened to the roof 51 and adjacent side wall. Two tracks 85 are provided each one being in vertical alignment with the corresponding one of the floor latch strips 60. Further, each of the tracks 85 includes a plurality of apertures, each of which is in vertical alignment with a corresponding one of the latching slots 72 of the corresponding keeper 70. The floor latch strips 60 and the tracks 85 are provided to enable a bulkhead 90 to be used as a movable lading separator, wherein the bulkhead 90 may be moved longitudinally of the car 50 to a plurality of positions to accommodate various sized and various arrangements of lading.

The bulkhead 90, it being understood that a plurality of identically constructed bulkheads may be used in a railway car 50, includes a center side panel 91 extending transversely of the railway car which has two end side channels 93 extending outwardly from the outside edges 92 of the panel 91, only one channel 93 being shown. While there is only illustrated in the accompanying drawings a corner portion of the bulkheads 90 it is to be understood that the ends of the bulkhead are identically constructed and description of one portion of the bulkhead is intended to be sufficient for corresponding portions not shwon. The end side channel 93 of the bulkhead 90 has an inturned flange 94 which extends vertically from near the top of the panel 91 to a point near the bottom of the panel 91, it being understood that the vertical extent of the channel 93 is less than that of the panel 91. The end side channel 93 has a rectangular opening 96 therein for a purpose hereinafter set forth. A bottom panel 98 is provided which extends below the side panel 91 and the end side channel 93 and completes the rectangular configuration of the bulkhead 90. The bulkhead 90 includes a second side panel 101 complementary in shape to the side panel 91, the side panel 101 having an end side channel 103 and an ainturned flange 104. The side panel 101 also includes a bottom panel 108, thereby to reproduce a mirror image of the side end and bottom panels 91, 98 and channel 93, as hereinbefore set forth.

Referring now to FIGS. 4 and 5, there is shown two vertically spaced apart and horizontally extending struts 110 and 111 fixedly connected to the side panel 101 and channel 103 and extending therefrom toward the side panels 91 and channel 93. Similarly, horizontal struts 115 and 116 are provided on the side channel 103 and are connected to an end panel 105 extending downwardly from the end panel 104. The struts 110 and 111 cooperate with side channel 93 to provide support for a rectangular, vertically extending sleeve 120. A vertically extending channel 93 extends across the bulkhead 90 and interconnects the side panels 91 and 101 and is provided with a bearing 126 surrounding an aperture (not shown), see FIG. 3. The channel 93 supports a horizontally extending plate 127 which is fixed thereto by a plurality of welds 128, the plate 127 having a cylindrical boss 129 on the underside thereof, for a purpose hereinafter set forth.

A lock pin mechanism 135 includes an elongated member 140 which is tapered from the top 141 thereof to the bottom 142 thereof. A shoulder 144 is integrally formed with the top 141 of the elongated member and provides support for a position indicator 145 which is securely mounted on the shoulder 144 and includes outwardly extending flanges 146 having an arcuate portion 147 which may be painted a bright color, all for a purpose hereinafter set forth. At the bottom of the elongated tapered member 140 there are two spaced apart latch elements 150, each of which includes tapered surfaces 151 meeting at an apex 152 at one end thereof and extending outwardly from the apex to form projections 153 as the outermost surfaces of the latch element. The projections 153 extend laterally outwardly of the elongated member 140 and also extend laterally outwardly of the associated locking slots 72 in the keeper 70.

The shoulder 144 and more particularly the position indicator 145 has a cylindrical boss 155 mounted thereon around which is positioned a spring retainer 156, the cylindrical boss supporting a mounting element 157 which extends upwardly of the boss 155 and may be integrally formed therewith. A clevis 160 is mounted to the mounting element 157 by means of a bolt and nut 161 and is fixedly connected to a cable 165 which extends upwardly to a second clevis 170. A compression spring 175 is positioned around the boss 129 and the spring retainer 156 thereby continually to urge the lock pin mechanism 135 downwardly toward the floor latch strip 60.

A control mechanism 180 includes a shaft 181 which extends laterally of the railway car 50 and along the bulkhead 90, the shaft 181 extending through the bearing 126 on the channel 93. A plate 185 having a mounting collar 186 is fixedly mounted to a shaft 181 and is maintained in place by a bolt and nut 187. The plate 185 is somewhat oblong in shape and receives the clevis 170 on one end thereof which is fixedly mounted thereto by a bolt and nut 171 and also receives a second clevis 190 fixedly connected thereto by a bolt and nut 191, the clevis 190 supporting a cable 195 extending upwardly from the clevis toward a latching element (not shown) for cooperation with the corresponding one of the tracks 85. The cable 195 is provided with a sleeve 196 which serves to maintain the cable in position with respect to the flange 94.

An actuator 200 is fixedly mounted on the shaft 181 and includes a collar 201 having a mounting flange 202 extending outwardly therefrom. Pivotally mounted to the mounting flange 202 is a clevis 203 having a detent 204 therein, the clevis being pivotally mounted on the bolt 205. The clevis 203 further includes a circular indentation 207 which is sufficiently deep enough and wide enough to accept the end of the shaft 181 therein, all for a purpose hereinafter to be set forth. A handle 210 extends outwardly from the clevis 203 to provide a lever arm which may be moved from the position shown in solid line in FIG. 3 in the direction of the arrow 115 through the position shown in dotted line to a position wherein the end of the shaft 181 is received in the indentation 207 and the detent 204 is in engagement with a pin 213 extending outwardly from the shaft 181. When the handle 210 is in position wherein the pin 213 is in engagement with the detent 204, rotation of the handle 210 will result in movement of the shaft 181 and the plate 185 carried thereby. Rotational movement of the plate 185 results in upward movement of the lock pin mechanism 135 to a position wherein the apex 152 of the latch element 150 is spaced vertically upwardly from the floor latch strip 60 so as to disengage the bulkhead 90 from the floor latch strip. Simultaneously, the upper locking elements (not shown) are moved downwardly and away from the tracks 85 thereby completely to free the bulkhead 90 for movement longitudinally of the railway car 50. Finally, there are two resilient members 215 mounted to respective ones of the flanges 94 and 104 to maintain the handle 210 out of the way when not in use.

In use, the bulkhead or lading separator 90 may be moved longitudinally of the car 50 so as to divide the car into various compartments. Since it is difficult to align the latch elements 150 with the locking slots 72, it is desirable that the lock pin mechanism 135 in its entirety be biased to the locking position thereof as shown in FIG. 4. The biasing of the lock pin mechanism 135 by the spring 175 results in the latch elements 150 seating in corresponding ones of the locking slots 72 immediately upon alignment of the latch elements with the slots. When it is desired to raise the latch elements 150 and disengage from the floor latch strip 60 in order to move the bulkhead 90, the handle 210 is moved from the full line position as shown in FIG. 3, and rotated in the direction of the arrow 115 through the position shown in phantom, to a position wherein the end of the shaft 181 seats within the indentation 207 in the clevis 203 and the detents 204 seat on the pin 213. Thereafter, rotation of the handle 210 and therefore the shaft 181 results in upward movement of the lock pin mechanism 135 through the connection thereof by a cable 165 with the plate 185. Simultaneously, the locking elements (not shown) connected to the cable 195 and seated in the tracks 85 are moved downwardly and away from the tracks 85, thereby to release the bulkhead 90 from engagement with the tracks 85 and the floor latch strips 60. When the lock pin mechanism 135 is in the unlatched position thereof, the bulkhead 90 is free to be moved longitudinally of the railway car 50. Unless the handle 210 of the actuator mechanism 200 is positioned as just described, the lock pin mechanism 135 is biased continually be the spring 175 to the latching position thereof wherein the latch element 152 is continually urged toward the keeper 70 and more particularly, into engagment with the slots 72.

An important feature of the present invention is the tapered surfaces 151 of the latch elements 150, which tapered surfaces permit the latch elements to be pried from the keeper 70 if lateral forces on the bulkhead 90 jamb the lock pin mechanism 135 against the keeper 70 so as to make difficult raising the lock pin mechanism 15 by actuation of the actuator 200. The clearance provided between the adjacent portions of the keeper 70 and the tapered surfaces 151 of the latch element 150 permit the insertion of a tool therebetween to permit the lock pin mechanism 135 to be pried from the keeper 70. This is an important feature of the present invention because cargo often shifts during movement of the railway car 50 and in some cases the cargo exerts pressure against the bulkhead 90 which makes movement of the lock pin mechanism between the latched and unlatched positions thereof difficult.

Another important feature of the present invention is the projections 153 on each latch element 150, the projections 153 extending beyond the side walls of the keeper 70 thereby to insure the latching contact of the lock pin mechanism 135 with the keeper 70 and more particularly, the locking slot 72. During normal movement of the railway car, the projections 153 permit full engagement of the apex 152 of the latch element 150 with the bottom 74 of the associated locking slot 72. In all cases, it should be understood that each lock pin mechanism 135 has one elongated member 140 which is tapered from the top 141 to the bottom 142 and which has two spaced apart downwardly projecting latch elements 150. It is seen, therefore, the each lock pin mechanism 135 simultaneously engages two locking slots 72 in the associated floor latch strip 60. Also, it is understood that each bulkhead 90 includes two lock pin mechanisms 135 positioned near each bottom corner of the bulkhead and two upwardly extending locking elements (not shown) which cooperate with a corresponding one of the tracks 85.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A lock pin for a lading separator for use in a freight carrying vehicle having a floor latch strip with locking slots therein, said lock pin comprising an elongated member having a tapered downwardly projecting latch element, said tapered latch element being constructed and arranged to fit within a locking slot in the floor latch strip and to provide a reduced area of contact between said latch element and the slot to enable said latch element to be pried from the slot, means for continually urging said latch element downwardly to a locking position thereof wherein said latch element is in engagement with a slot in the floor latch strip, and control mechanism for moving said latch element to an unlocking position thereof wherein said latch element is spaced from the floor latch strip thereby enabling movement of the lading separator longitudinally of the freight carrying vehicle, whereby said latch element is normally biased into the locking position thereof to prevent movement of the lading separator and may be moved to the unlocking position thereof by actuation of said control mechanism and may be moved to the unlocking position thereof if jammed due to loading forces on the lading separator by insertion of a tool between the locking slot and said tapered latch element followed by prying the latch element to the unlocking position thereof.

2. The lock pin set forth in claim 1, wherein said elongated member is tapered from the top thereof to the bottom thereof.

3. The lock pin set forth in claim 1, wherein said latch element includes two spaced-apart members each being tapered and each being constructed and arranged to fit within a locking slot in the associated floor latch strip.

4. The lock pin set forth in claim 1, wherein said tapered latch element tapers to an apex having a reduced width which abuts the bottom of the associated locking slot.

5. The lock pin set forth in claim 1, wherein said means for continually urging said latch element downwardly is a spring.

6. The lock pin set forth in claim 1, wherein said control mechanism includes a handle pivotal between a storage position thereof wherein said handle is operatively disengaged from said elongated member and an actuating position wherein said handle is operatively connected to said elongated member.

7. The lock pin set forth in claim 1, wherein said control mechanism is connected to said latch element by a cable.

8. A lock pin for a lading separator for use in a freight carrying vehicle having a floor latch strip with locking slots therein, said lock pin comprising an elongated member having a tapered downwardly projecting latch element, said tapered latch element being constructed and arranged to fit within a locking slot in the floor latch strip and to provide a reduced area of contact between said latch element and the slot to enable said latch element to be pried from the slot, said tapered latch element having projections extending outwardly thereof beyond the side walls of the locking slots in the floor latch strip to prevent said latch element from dislodging from the locking slot, means for continually urging said latch element downwardly to a locking position thereof wherein said latch element is in engagement with a slot in the floor latch strip, and control mechanism for moving said latch element to an unlocking position thereof wherein said latch element is spaced from the floor latch strip thereby enabling movement of the lading separator longitudinally of the freight carrying vehicle, whereby said latch element is normally biased into the locking position thereof to prevent movement of the lading separator and may be moved to the unlocking position thereof by actuation of said control mechanism and may be moved to the unlocking position thereof if jammed due to loading forces on the lading separator by insertion of a tool between the locking slot and said tapered latch element followed by prying the latch element to the unlocking position thereof.

9. The lock pin set forth in claim 8, wherein said projections extend outwardly a sufficient distance to provide a bearing surface for prying the latch element to the unlocking position thereof.

10. A lock pin for a lading separator for use in a freight carrying vehicle having a floor latch strip with locking slots therein, said lock pin comprising an elongated member having a tapered downwardly projecting latch element, said tapered latch element being constructed and arranged to fit within a locking slot in the floor latch strip and to provide a reduced area of contact between said latch element and the slot to enable said latch element to be pried from the slot, means for continually urging said latch element downwardly to a locking position thereof wherein said latch element is in engagement with a slot in the floor latch strip, indicator means mounted on said elongated member and extending outwardly therefrom to indicate the position of said latch element with respect to the floor latch strip, and control mechanism for moving said latch element to an unlocking position thereof wherein said latch element is spaced from the floor latch strip thereby enabling movement of the lading separator longitudinally of the freight carrying vehicle, whereby said latch element is normally biased into the locking position thereof to prevent movement of the lading separator and may be moved to the unlocking position thereof by actuation of said control mechanism and may be moved to the unlocking position thereof if jammed due to loading forces on the lading separator by insertion of a tool between the locking slot and said tapered latch element followed by prying the latch element to the unlocking position thereof.

11. The lock pin set forth in claim 10, wherein said indicator is visible through the associated lading separator.

12. The lock pin set forth in claim 10, wherein said indicator has the outside surface thereof covered with a bright color.

* * * * *